Figure 1:
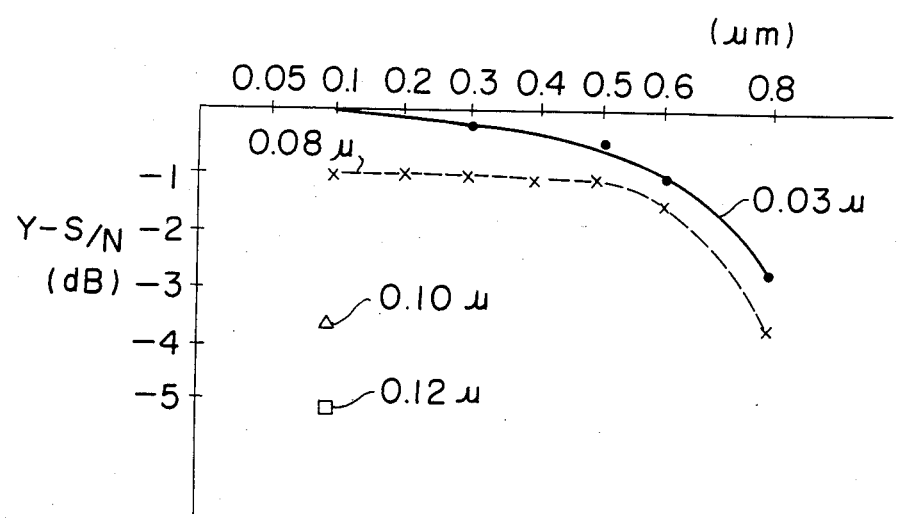

United States Patent [19]

Nishimatsu et al.

[11] Patent Number: 4,591,528
[45] Date of Patent: May 27, 1986

[54] MAGNETIC RECORDING MEDIUM

[75] Inventors: Masaharu Nishimatsu, Komoro; Toshiaki Ide, Saku; Yuichi Kubota, Komoro; Yoshiaki Saito; Hiroyuki Arioka, both of Saku, all of Japan

[73] Assignee: TDK Corporation, Tokyo, Japan

[21] Appl. No.: 636,502

[22] Filed: Aug. 1, 1984

[30] Foreign Application Priority Data

Aug. 22, 1983 [JP] Japan .................. 58-151478

[51] Int. Cl.$^4$ .............................. G11B 5/72
[52] U.S. Cl. .................. 428/212; 252/62.54; 360/134; 360/135; 360/136; 427/44; 427/131; 427/128; 428/323; 428/328; 428/694; 428/900; 428/408
[58] Field of Search .......... 428/694, 900, 328, 405, 428/403, 407, 423.9, 212, 408, 695, 323; 427/131, 132, 128, 44; 252/62.54; 360/134-136

[56] References Cited

U.S. PATENT DOCUMENTS

| | | | |
|---|---|---|---|
| 4,091,924 | 5/1978 | Newton | 428/694 |
| 4,109,046 | 8/1978 | Hammon | 428/900 |
| 4,328,935 | 5/1982 | Steel | 428/329 |
| 4,367,261 | 1/1983 | Miyoshi | 428/694 |
| 4,419,406 | 12/1983 | Isobe | 428/694 |
| 4,439,486 | 3/1984 | Yamada | 428/694 |
| 4,442,171 | 4/1984 | Sato | 428/694 |
| 4,451,531 | 5/1984 | Isobe | 428/694 |
| 4,452,863 | 6/1984 | Takizawa | 428/694 |
| 4,455,345 | 6/1984 | Miyatuka | 428/457 |
| 4,465,737 | 8/1984 | Miyatuka | 428/457 |
| 4,547,419 | 10/1985 | Nishimatsu | 428/694 |

Primary Examiner—Ellis P. Robinson
Attorney, Agent, or Firm—Oblon, Fisher, Spivak, McClelland & Maier

[57] ABSTRACT

A magnetic recording medium comprising a plastic base film, a magnetic layer formed on one side of the base film and composed of a ferromagnetic alloy powder dispersed in a resin binder, and a backing layer formed on the other side of the base film, characterized in that said ferromagnetic alloy powder has a surface area of at least 48 m$^2$/g as measured by BET method, said magnetic layer has a coercive force of at least 1,000 Oe and a surface roughness of at most 0.08 μm, and said backing layer is composed essentially of a thermoset or radiation-cured resin and carbon black dispersed in the resin, and has a surface roughness of from 0.05 to 0.6 μm, said carbon black having an average particle size of from 10 to 60 μm as measured by an electron microscope.

4 Claims, 2 Drawing Figures

MAGNETIC RECORDING MEDIUM

The present invention relates to a magnetic recording medium, and more particularly to a high density recording medium having excellent physical and electromagnetic conversion characteristics.

As ferromagnetic powders which have been employed for magnetic recording media, there are, for instance, $\gamma$-$Fe_2O_3$, Co-containing $\gamma$-$Fe_2O_3$, $Fe_3O_4$, Co-containing $Fe_3O_4$ and $CrO_2$. However, the magnetic characteristics of these ferromagnetic powders, such as the coercive force and the maximum residual magnetic flux density, are inadequate for high density recording with high sensitivity, and they are not suitable for magnetic recording of a signal having a short recording wavelength of at most about 1 $\mu$m or for magnetic recording with a narrow track width.

As the requirements for such magnetic recording media have become to be severe, ferromagnetic powders having characteristics suitable for high density recording have been developed or proposed. As such magnetic powders, there may be mentioned metals or alloys such as Fe, Co, Fe-Co, Fe-Co-Ni and Co-Ni, or alloys of these materials with Al, Cr or Si. A magnetic recording layer employing such an alloy powder, is required to have a high coercive force and a high residual magnetic flux density for the purpose of the high density recording, and it is required to select a process for the preparation or an alloy composition so that the above-mentioned magnetic powder meets these requirements.

The present inventors have prepared magnetic recording media by employing various alloy powders, and have found that a magnetic recording medium with a noise level being sufficiently low and suitable for high density short wave recording is obtainable when the specific surface area as measured by BET method is at least 48 $m^2/g$, the coercive force of the magnetic layer is at least 1000 Oe, and the surface roughness of the magnetic layer is at most 0.08 $\mu$m as a $R_{20}$ value (an average value of 20 values) with a cut off of 0.17 mm by Talystep method. However, from a further study, it has been found that when the magnetic recording medium is wound or permitted to run e.g. as a video tape, the desired effects are not necessarily obtainable even when the magnetic layer satisfy the above-mentioned requirements, and that the properties of the rear side of the plastic film (usually polyester film) supporting the magnetic layer, have a close relationship with the physical and electric characteristics of the magnetic recording medium.

Under the circumstances, the present inventors have tried to form a backing layer to the rear side of the plastic base film. As a result, it has been found that the S/N ratio of the magnetic recording medium is affected not only by the specific surface area of the alloy powder used for the magnetic layer as measured by BET method and the surface roughness of the magnetic layer, but also by the surface roughness of the backing layer. Further, because of additional problems such as the cinching phenomenon (the loosening of the tape winding when the tape has been stopped abruptly), the abrasion or friction of the backing layer and the adhesion of the magnetic layer with the backing layer, it is impossible to obtain a magnetic recording medium having superior electromagnetic conversion characteristics, running characteristics and durability, without using a proper backing layer. Furthermore, the backing layer tends to be electrostatically charged by friction, whereby there will be problems such that magnetic powder particles fallen off from the surface of the magnetic layer due to the deterioration of the coated layer are likely to deposit on the backing layer, and then the particles are likely to be transferred from the backing layer to the magnetic layer when the latter is brought in contact with the backing layer.

It has been found that the abrasion of the backing layer is substantially prevented by using for the backing layer a thermosetting composition comprising a vinyl chloride-vinyl acetate-vinyl alcohol copolymer, a polyurethane prepolymer and a polyisocyanate, or a thermosetting composition comprising such components and nitrocellulose, whereby the number of dropouts can be minimized.

However, when a wound tape is unwound for running, so-called peeling electrostatic charge is created between the magnetic layer surface and the base film surface. Therefore, it is necessary to lower the electric resistance of the backing layer surface. By reducing the electric resistance of the backing layer surface, the deposition of dusts or foreign matters during the running operation of the tape can be prevented, whereby the number of dropouts can substantially be reduced.

In the case of an alloy powder magnetic layer, fine finishing of the surface roughness is required to improve the electromagnetic characteristics, as compared with the conventional $\gamma$-$Fe_2O_3$ or Co-containing $\gamma$-$Fe_2O_3$ type. When the surface roughness is minimized for this purpose, the friction increases, and it is thereby likely that the tape stops during the running operation, or the tape winding tends to be irregular.

As a result of the study on the material for the backing layer for the alloy magnetic recording medium, it has been found important to reduce the electric resistance of the backing layer surface.

Carbon black has a low electric resistance, and the peeling electrostatic charge is minimum, whereby no irregularity in the tape winding is likely to be led, and the frictional level is constant.

Thus, the present invention provides a magnetic recording medium comprising a plastic base film, a magnetic layer formed on one side of the base film and composed of a ferromagnetic alloy powder dispersed in a resin binder, and a backing layer formed on the other side of the base film, characterized in that said ferromagnetic alloy powder has a surface area of at least 48 $m^2/g$ as measured by BET method, said magnetic layer has a coercive force of at least 1,000 Oe and a surface roughness of at most 0.08 $\mu$m, and said backing layer is composed essentially of a thermoset or radiation-cured resin and carbon black dispersed in the resin, and has a surface roughness of from 0.05 to 0.6 $\mu$m, said carbon black having an average particle size of from 10 to 60 m$\mu$m as measured by an electron microscope.

Now, the present invention will be described in detail with reference to the preferred embodiments.

In the accompanying drawings, FIG. 1 is a graph illustrating the relationship between the S/N ratio and the surface roughness of the magnetic and backing layer of the magnetic recording medium.

Figure 2:
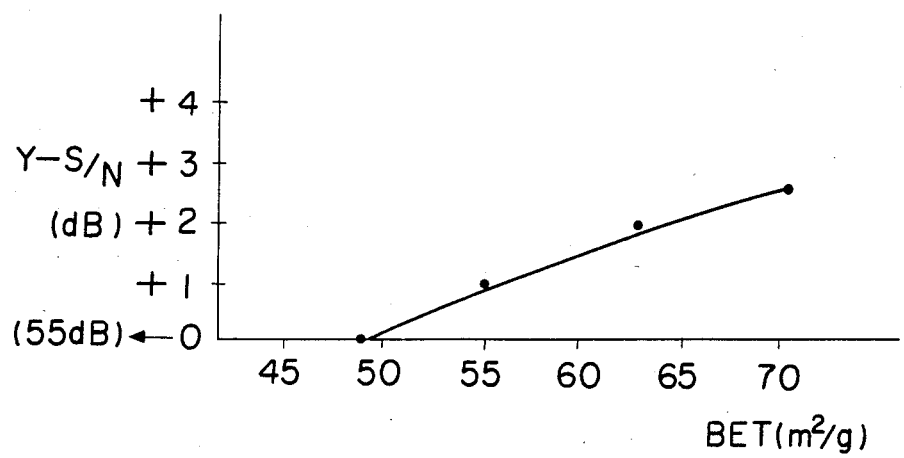

FIG. 2 is a graph illustrating the relationship between the S/N ratio and the BET specific surface area of the alloy magnetic powder.

If the average particle size of carbon black exceeds 60 m$\mu$m as measured by an electron microscope, the surface property tends to be inferior, the head touch of the tape with the head tends to be poor, and the electromagnetic characteristics tend to be inferior.

Whereas, the backing layer of the present invention wherein a carbon black having an average particle size of from 10 to 60 mμm as measured by an electron microscope, is used, has a proper modulus of elasticity, and the carbon black is firmly bonded with the binder layer, whereby the abrasion of the backing layer is minimum. When the average particle size exceeds 60 mμm, the bond between the carbon black and the binder is not firm enough to be resistant against the abrasion of the backing layer, even if the modulus of elasticity is adequate.

In the case of a alloy magnetic layer, the electromagnetic characteristics tend to deteriorate if the surface roughness of the backing layer is outside the range of from 0.05 to 0.6 μm. This is attributable to the fact that when the wound tape is stored at a high temperature, if the surface roughness of the backing layer is inferior, i.e. great, the alloy magnetic layer with its surface finished better than the γ-$Fe_2O_3$ or Co-containing γ-$Fe_2O_3$ layer, will be thereby greatly affected, and it has been found that this will lead to an increase of dropouts.

There are two ways for the calender treatment during the production process, i.e. one way in which the backing layer is first formed and then the magnetic layer is formed, and the other way in which the magnetic layer is first formed and then the backing layer is formed. In either case, the surface roughness of the backing layer will be improved by employment of the calendering treatment. In such a case, the surface roughness of the backing layer substantially affects the magnetic layer during the calender treatment. Particularly, in the case of a tape wherein a alloy magnetic powder is used, the base film is likely to be as thin as 11 μm or less, and accordingly the influence of the surface roughness of the backing layer will be greater. It has been found that the influence to the magnetic layer is minimum when the tape is finished by calender treatment to bring the surface roughness $R_{20}$ of the backing layer to a level of from 0.05 to 0.6 μm.

Upon the completion of the coating operation of the thermosetting resin, the curing reaction has not yet started in the backing layer, and the coated layer is still weak. Yet, the backing layer is closely in contact with the magnetic layer. Accordingly, during the thermosetting operation, the mutually contacting layers tend to transfer to the opposite layers, respectively.

By substituting a radiation curable resin for the thermosetting resin, such a problem has been solved, and a further advantage has been brought about. Namely, not only the transfer of the layers during the thermosetting operation can be eliminated, but also the electron ray radiation can be conducted on-line after the calendering treatment in the coating process, whereby the curing reaction is completed prior to the winding-up operation, and no influence will be given to the respective opposite layers when the cured medium is wound up. In the case of the thermosetting resin, the curing reaction is not yet completed during the coating process, and the transfer to the opposite layers is likely to take place even during the winding-up operation in the coating process.

Thus, a radiation-cured backing layer is advantageous for an alloy magnetic layer, and a radiation curable type magnetic layer is advantageous as the magnetic layer.

The magnetic layer of the magnetic recording medium of the present invention has a coercive force (Hc) of at least 1000 Oe and a surface roughness of at most 0.08 μm. The alloy magnetic powder in the magnetic layer has a specific surface area of at least 48 $m^2$/g as measured by BET method.

The preferred range of the coercive force is from 1000 to 2000 Oe. If the coercive force exceeds this range, the magnetic head tends to be saturated at the time of recording, or it becomes difficult to erase the magnetization. The greater the specific surface area of the magnetic powder, the more the S/N ratio will be improved. However, if the specific surface area is too large, the dispersibility of the magnetic powder into the binder tends to be poor, or the effectiveness tends to be saturated. On the other hand, if the surface roughness is small, the recording sensitivity for a short wavelength will increase.

As a magnetic alloy satisfying the above characteristics, there may be employed a fine powder of Co, Fe-Co, Fe-Co-Ni or Co-Ni, or such a fine powder mixed with Cr, Al or Si. It may be a fine powder obtained by wet-reducing a metal salt with a reducing agent such as $BH_4$, a fine powder obtained by coating the surface of iron oxide with a Si compound and dry-reducing the product in $H_2$ gas, or a fine powder obtained by evaporating an alloy in a low pressure argon atmosphere, and it has an axial ratio of from 1:5 to 1:10 and a residual magnetic flux density Br of from 2000 to 3000 gauss, and satisfies the above-mentioned conditions for the coercive force and the surface area.

Various binders may be employed in combination with the alloy magnetic powder to prepare magnetic coating compositions. It is usually preferred to employ a thermosetting resin binder or an electron beam curable resin binder. As other additives, there may be employed a dispersant, a lubricant or an antistatic agent in accordance with the conventional method. In a case where there is a problem in the dispersibility because of the employment of the magnetic powder having a BET specific surface area of 48 $m^2$/g, a surfactant or an organic titanium coupling agent may be employed as the dispersant. As the binder, there may be employed a binder comprising a vinyl chloride-vinyl acetate-vinyl alcohol copolymer, a polyurethane prepolymer and a polyisocyanate, such a binder which further contains nitrocellulose, other known thermosetting binders, or a radiation curable resin binder containing resin groups such as acrylic double bonds or maleic double bonds sensitive to ionized energy.

In accordance with a usual method, the alloy magnetic powder is mixed with the binder and a predetermined solvent and various additives to prepare a magnetic coating material. The coating material is coated on a substrate such as a polyester base film and then subjected to thermosetting or electron beam curing to form a magnetic layer. Then, a backing layer is formed in a similar manner. Each layer or the entire product is subjected to super calendering to obtain a recording medium having a predetermined surface roughness.

In the present invention, the backing layer formed on the rear side of a thin base film such as a polyester base film, is generally classified into two types, i.e. one type being a thermosetting resin composition, and the other type being a radiation curable (or ionizable) resin composition which will be described hereinafter. The radiation curable resin described hereinafter may be applied also to the magnetic layer.

It has been found that as the thermosetting resin composition to be used for the backing layer, a thermosetting binder comprising a vinyl chloride-vinyl acetate-vinyl alcohol copolymer, a polyurethane prepolymer and a polyisocyanate or a thermosetting binder comprising such components and nitrocellulose, and containing carbon black, exhibits an excellent thermosetting property. The radiation curable resin composition to be used for the backing layer is a resin binder composed essentially of a radiation sensitive resin having radiation curable double bonds such as acrylic, maleic or allyl-type double bonds, and containing carbon black.

The carbon black to be used, is selected from those having an average particle size of from 10 to 60 m$\mu$m as measured by an electron microscope. If the average particle size is less than 10 m$\mu$m, the electrostatic property of the backing layer can not adequately be lowered. On the other hand, if the average particle size exceeds 60 m$\mu$m, the dispersion of the carbon black tends to be non-uniform, the antistatic effect tends to be poor, and the surface tends to be so rough that the magnetic layer is likely to be roughened when the magnetic tape is wound up. The content of the carbon black is preferably at least about 20% by weight of the binder in the backing layer. However, if the amount is excessive, the adhesion of the backing layer to the base film tends to be deteriorated. Therefore, the upper limit is preferably 80% by weight.

The surface roughness of the backing layer of the present invention is adjusted to be from 0.05 to 0.6 $\mu$m. Coupled with the material of the backing layer, this surface roughness serves not only to improve the running characteristics of the tape and the abrasion resistance, but also to reduce the adhesion with the magnetic layer and the cinching phenomenon. Furthermore, it has been found that in connection with the surface roughness of the magnetic layer, the S/N ratio can be maintained at a satisfactory level when the surface roughness of the backing layer is at most 0.6 $\mu$m. It has been found that when the surface roughness is less than 0.05 $\mu$m, there will be the cinching phenomenon, the adhesion and a problem in the running property.

The proportions of the components of the binder for the backing layer, may be varied within wide ranges in the case of the thermosetting binder. However, in the case of a combination of a vinyl chloride-vinyl acetate-vinyl alcohol copolymer and a polyurethane, it is preferred to use from 10 to 80% by weight of the former and the rest being the latter and to add a polyisocyanate in an amount of from 5 to 80 parts by weight relative to 100 parts by weight of the total amount of the above resins.

In the case where nitrocellulose is added to the above binder composition, from 15 to 60% by weight of nitrocellulose, from 15 to 60% by weight of a vinyl chloride-vinyl acetate-vinyl alcohol copolymer and from 10 to 70% by weight of a polyurethane may be used to bring the total amounts to be 100% by weight. Then, a polyisocyanate is added in an amount of from 5 to 80 parts by weight relative to 100 parts by weight of the total amount of the above resins. The addition of nitrocellulose serves to further reduce the adhesion and to further improve the abrasion resistance.

In the case where a radiation curable binder is used for the backing layer of the present invention, the following resins may be used as resins containing radiation curable double bonds such as acrylic, maleic or allyl-type double bonds.

(I) Vinyl chloride type copolymers:

There may be mentioned a vinyl chloride-vinyl acetate-vinyl alcohol copolymer, a vinyl chloride-vinyl alcohol copolymer, a vinyl chloride-vinyl alcohol-vinyl propionate copolymer, a vinyl chloride-vinyl acetate-maleic acid copolymer, a vinyl chloride-vinyl acetate-OH-terminated side chain alkyl group copolymer, such as VROH, VYNC or VYEGX, manufactured by UCC (Union Carbide Corporation, U.S.A.), and a maleic acid modified VERR also manufactured by UCC.

These copolymers can be modified to radiation-sensitive resins by introducing into them acrylic double bonds, maleic double bonds or allyl-type double bonds by the process described later.

(II) Unsaturated polyester resins:

There may be mentioned saturated polyester resins obtained by the esterification of saturated polybasic acids such as phthalic acid, isophthalic acid, terephthalic acid, maleic acid, maleic acid derivatives, succinic acid, adipic acid or sebacic acid, with polyhydric alcohols such as ethylene glycol, diethylene glycol, glycerol, trimethylol propane, 1,2-propylene glycol, 1,3-butanediol, dipropylene glycol, 1,4-butanediol, 1,6-hexanediol, pentaerythritol, sorbitol, glycerin, neopentyl glycol or 1,4-cyclohexane dimethanol, and resins obtained by the modification of these polyester resins with e.g. SO$_3$Na (e.g. Vylon 53S).

These resins can be modified to radiation-sensitive resins by the process mentioned hereinafter.

(III) Unsaturated polyester resins:

There may be mentioned polyester compounds containing radiation-curable unsaturated double bonds in the molecular chains, such as unsaturated polyester resins, prepolymers, and oligomers containing radiation curable unsaturated double bonds, which correspond to the saturated polyester resins prepared by the esterification of polybasic acids with polyhydric alcohols as referred to as the thermoplastic resins in the above (II) with the exception that a part of the polybasic acid has been replaced by maleic acid.

Examples of the polybasic acids and polyhydric alcohols for the saturated polyester resins include those compounds as enumerated in the above (I), and examples of the radiation-curable unsaturated double bonds include maleic acid, fumaric acid, and so forth.

The radiation-curable unsaturated polyester resin can be produced by adding maleic acid, fumaric acid, or the like to at least one polybasic acid component and at least one polyhydric alcohol component, and then subjecting the mixture to a dehydration or dealcoholization reaction in the conventional manner, i.e. at a temperature of from 180° to 200° C. in a nitrogen atmosphere in the presence of a catalyst, thereafter raising the temperature to a range of from 240° to 280° C. whereupon a condensation reaction is effected under a reduced pressure of from 0.5 to 1 mmHg, to obtain a polyester resin. The content of maleic acid, fumaric acid, or the like may be in a range of from 1 to 40 mol %, or preferably from 10 to 30 mol %, in the acid component in view of the degree of cross-linking at the time of its production, the radiation-curability, and so on.

(IV) Polyvinyl alcohol type resins:

There may be mentioned polyvinyl alcohol, butyral resins, acetal resins, formal resins, and copolymers of these components.

The hydroxyl groups contained in these resins can be modified to be radiation-sensitive by the process described hereinafter.

(V) Epoxy type resins and phenoxy resins:

There may be mentioned epoxy resins obtained by the reaction of bisphenol A with epichlorohydrin, methylepichlorohydrin or the like, such as EPIKOTE 152, 154, 828, 1001, 1004 and 1007 (manufactured by Shell Chemical Company); DEN431, DER732, DER511 and DER331 (manufactured by Dow Chemical Company); EPICLON-400 and EPICLON-800 (manufactured by Dai-Nippon Ink K.K.); phenoxy resins such as PKHA, PKHC and PKHH which are the highly polymerized resins among the above-mentioned epoxy resins, and are manufactured by Union Carbide Corporation; and co-polymers of brominated bisphenol A with epichlorohydrin, such as EPICLON 145, 152, 153 and 1120 (manufactured by Dai-Nippon Ink & Chemicals Co.) and others.

The radiation-sensitive modification is effected by utilization of the epoxy groups contained in these resins.

(VI) Cellulose derivatives:

Cellulose derivatives of various molecular weights are also effective as thermoplastic components. Particularly effective and preferable among these cellulose derivatives are nitrocellulose, cellulose aceto-butylate, ethyl-cellulose, butyl-cellulose, acetyl-cellulose, and so forth.

These cellulose derivatives are modified to radiation-sensitive resins by activating the hydroxyl groups in the resins by the process mentioned hereinafter.

Besides the above, the resins which may also be used effectively for the radiation-sensitive modification are polyfunctional polyester resins, polyether ester resins, polyvinyl pyrrolidone resins and derivatives thereof (e.g., PVP olefin copolymers), polyamide resins, polyimide resins, phenol resins, spiro-acetal resins, acrylic resins containing therein at least one acrylic or methacrylic acid ester having a hydroxyl group as the polymerization component, and the like.

Further, by blending a thermoplastic elastomer or prepolymer with the above-described radiation-sensitive, modified thermoplastic resin, it is possible to make the coating film much more tenacious. Furthermore, when such an elastomer or prepolymer is likewise modified to be radiation-sensitive, a better result can be obtained, as will be described hereinbelow.

In the following, there will be given examples of the elastomers and prepolymers which may be combined with the above-described radiation-sensitive resins.

(I) Polyurethane elastomers, prepolymers and telomers:

The use of polyurethane elastomers is particularly effective in that their abrasion resistance and adhesion to EPT films are satisfactory.

Examples of such effective urethane compounds are: polyurethane elastomers, prepolymers, and telomers which are composed of polycondensates of various polyhydric isocyanates, as the isocyanate components, such as 2,4-toluene diisocyanate, 2,6-toluene diisocyanate, 1,3-xylene diisocyanate, 1,4-xylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylbiphenylene diisocyanate, 4,4'-biphenylene diisocyanate, hexamethylene diisocyanate, isophorone diisocyanate, dicyclohexylmethane diisocyanate, Desmodule L, Desmodule N, and so on; and various polyesters such as linear saturated polyesters (e.g. those obtained by polycondensation of polyhydric alcohols such as ethylene glycol, diethylene glycol, glycerin, trimethylolpropane, 1,4-butanediol, 1,6-hexanediol, pentaerythritol, sorbitol, neopentyl glycol, 1,4-cyclohexane dimethanol, and so forth with saturated polybasic acids such as phthalic acid, isophthalic acid, terephthalic acid, maleic acid, succinic acid, adipic acid, sebasic acid, and so forth), linear saturated polyethers (e.g. polyethylene glycol, polypropylene glycol, polytetraethylene glycol, and so forth) as well as caprolactum, hydroxyl-containing acrylic acid esters, hydroxyl-containing methacrylic acid esters, and so forth.

While these elastomers may be combined, as they are, with various radiation-sensitive thermoplastic resins, it will be highly effective to further react these elastomers with a monomer having an acrylic double bond, an allyl-type double bond, or the like which reacts with the terminal isocyanate group or hydroxyl group in the urethane elastomer, to thereby modify the resins to be radiation-sensitive.

(II) Elastomers of acrylonitrile-butandiene copolymers:

Prepolymers of acrylonitrile-butandiene copolymers containing therein terminal hydroxyl groups, such as "poly BD Liquid Resin" produced by Sinclair Petrochemicals Corp. and available in general market, or elastomers such as "Hycar 1432J" manufactured by Japanese Zeon K.K., and so forth are particularly suitable as the elastomeric components, with which the double bonds in butadiene produce radicals by the radiation rays to cause cross-linking and polymerization.

(III) Polybutadiene elastomers:

Low molecular weight prepolymers having the terminal hydroxyl groups, such as "Poly BD Liquid Resin R-15", manufactured by Sinclair Petrochemicals Corp., are particularly suitable in respect of their compatibility with thermoplastic resins. In the "R-15" prepolymer, since the terminal end of the molecule is occupied by the hydroxyl group, it is possible to enhance the radiation sensitivity by adding an acrylic unsaturated double bond to the terminal end of the molecule, whereby the prepolymer becomes much more advantageous as the binder.

Further, cyclized products of polybutadiene such as "CBR-M901" manufactured by Japan Synthetic Rubber Co., also exhibit excellent performance by their combination with the thermoplastic resins. In particular, cyclized polybutadienes are highly efficient in their cross-linking and polymerization by radiation because of the radicals of the unsaturated bonds inherent to polybutadiene. Thus, they have excellent properties as the binder.

Further, suitable among other thermoplastic elastomers and their prepolymers are: styrene-butadiene rubbers, chlorinated rubbers, acrylic rubbers, isoprene rubbers and their cyclized products (e.g. "CIR701", manufactured by Japan Synthetic Rubber K.K.), and elastomers such as epoxy-modified rubbers, or internally plasticized saturated linear polyesters (e.g. "Vylon #300", a product of Toyo Spinning K.K.). These may also be used effectively by subjecting them to the modifying treatment for the radiation-sensitization described hereinbelow.

In addition to such elastomers, there may be added an epoxy resin, a phenoxy resin or a vinyl chloride-vinyl chloride copolymer.

Now, examples for the syntheses of the radiation-sensitive binders will be given.

Production of tolylene diisocyanate adduct (a) Synthesis of an acryl-modified product of a vinyl chloride-vinyl acetate copolymer type resin (radiation-sensitive modified resin)

750 Parts by weight of Vinylite VAGH, 1250 parts by weight of toluene, and 500 parts by weight of cyclohexanone were charged into a four-necked flask of a 5-liter capacity and dissolved under heating. After raising the temperature to 80° C., 61.4 parts by weight of 2-hydroxyethyl methacrylate adduct of tolylene diisocyanate was added. Further, 0.012 part by weight of tin octylate and 0.012 part by weight of hydroquinone were added, and the reaction was carried out at a temperature of 80° C. in a nitrogen ($N_2$) stream until the conversion of NCO reached 90%. After completion of the reaction, the reaction system was cooled and diluted by addition of 1250 parts by weight of methyl ethyl ketone.

Production of 2-hydroxyethyl methacrylate (2HEMA) adduct of tolylene diisocyanate (TDI)

348 Parts by weight of tolylene diisocyanate was heated to a temperature of 80° C. in a four-necked flask of one-liter capacity in a nitrogen ($N_2$) stream. Thereafter, 260 parts by weight of 2-hexamethylene methacrylate, 0.07 part by weight of tin octylate, and 0.05 part by weight of hydroquinone were added dropwise into a reaction vessel, while cooling to control the temperature inside the reaction vessel to be in a range of from 80° to 85° C. After completion of the dropwise addition, the mixture was stirred for three hours at 80° C. to complete the reaction. After completion of the reaction, the reaction product was taken out of the reaction vessel and cooled to obtain 2-hydroxyethyl methacrylate (2HEMA) adduct of tolylene diisocyanate (TDI) as a white paste.

(b) Synthesis of an acryl-modified product of a butyral resin (radiation-sensitive modified resin)

100 Parts by weight of a butyral resin, "BM-S" produced by Sekisui Chemical Co., was charged into a four-necked flask of a 5-liter capacity, together with 191.2 parts by weight of toluene and 71.4 parts by weight of cyclohexanone, and dissolved under heating. After raising the temperature to 80° C., 7.4 parts by weight of the 2-hydroxyethyl methacrylate adduct of tolylene diisocyanate was added to the solution, followed by further addition of 0.015 part by weight of tin octylate and 0.015 part by weight of hydroquinone. Then, the reaction was carried out at 80° C. in a nitrogen ($N_2$) stream until the conversion of NCO reached at least 90%. After completion of the reaction, the reaction product was cooled and diluted with methyl ethyl ketone.

(c) Synthesis of an acryl-modified product of a saturated polyester resin (radiation-sensitive modified resin)

100 Parts by weight of "Vylon RV-200" manufactured by Toyo Spinning Co., was dissolved under heating in 116 parts by weight of toluene and 116 parts by weight of methyl ethyl ketone. After raising the temperature to 80° C., 3.55 parts by weight of the 2HEMA adduct of TDI was added, followed by further addition of 0.007 part by weight of tin octylate and 0.007 part by weight of hydroquinone. Then, the reaction was carried out at 80° C. in a nitrogen ($N_2$) stream until the conversion of NCO reached at least 90%.

(d) Synthesis of an acryl-modified product of an epoxy resin (radiation-sensitive modified resin)

400 Parts by weight of "Epikote 1007" manufactured by Shell Chemical Co., was dissolved under heating in 50 parts by weight of toluene and 50 parts by weight of methyl ethyl ketone. Thereafter, 0.006 part by weight of N,N-dimethylbenzylamine and 0.003 part by weight of hydroquinone were added to the solution, and the temperature was raised to 80° C. Then, 69 parts by weight of acrylic acid was added dropwise, and the reaction was carried out at 80° C. until the acid value became 5 or lower.

(e) Synthesis of an acryl-modified product of a urethane elastomer (radiation-sensitive elastomer)

250 Parts by weight of an isocyanate-terminated diphenylmethane diisocyanate (MDI) type urethane prepolymer, "Nipporan 4040", manufactured by Nippon Polyurethane Industry Co., 32.5 parts by weight of 2HEMA, 0.07 part by weight of hydroquinone, and 0.009 part by weight of tin octylate were charged into a reaction vessel, and dissolved under heating at 80° C. Then, 43.5 parts by weight of TDI was added dropwise into the reaction vessel, while cooling to control the temperature inside of the reaction vessel to be in a range of from 80° to 90° C. After completion of the dropwise addition, the reaction was conducted at 80° C. until the conversion of NCO reached at least 95%.

(f) Synthesis of an acryl-modified product of a polyether type terminal urethane-modified elastomer (radiation-sensitive elastomer)

250 Parts by weight of a polyether, "PTG-500" manufactured by Nippon Polyurethane Industry, 32.5 parts by weight of 2HEMA, 0.007 part by weight of hydroquinone, and 0.009 part by weight of tin octylate were charged into a reaction vessel, and dissolved under heating at 80° C. Then, 43.5 parts by weight of TDI was added dropwise into the reaction vessel, while cooling to control the temperature inside of the raction vessel to be in a range of from 80° to 90° C. After completion of the dropwise addition, the reaction was conducted at 80° C. until the conversion of NCO reached at least 95%.

(g) Synthesis of an acryl-modified product of a polybutadiene elastomer (radiation-sensitive elastomer)

250 Parts by weight of a low molecular weight hydroxyl-terminated polybutadiene, "Poly-BD-Liquid Resin R-15" manufactured by Sinclair Petrochemicals, Inc., 32.5 parts by weight of 2HEMA, 0.007 part by weight of hydroquinone, 0.009 part by weight of tin octylate were charged into a reaction vessel, and dissolved under heating at 80° C. Then, 43.5 parts by weight of TDI was added dropwise, while cooling to control the temperature inside of the reaction vessel to be in a range of from 80° to 90° C. After completion of the dropwise addition, the reaction was conducted at 80° C. until the conversion of NCO reached at least 95%.

Among high-polymer substances, there have been known those which undergo decomposition when irradiated with radiation rays and those which undergo cross-linking among the molecules by the irradiation with radiation rays. Those which undergo cross-linking among the molecules include polyethylene, polypropylene, polystyrene, polyacrylic acid ester, polyacrylamide, polyvinyl chloride, polyester, polyvinyl pyrrolidone rubbers, polyvinyl alcohol and polyacrolein. Such cross-linking type polymers can be used as radiation curable coating resins for the backing layer, as they are, i.e. without subjecting them to any particular modifying treatment as mentioned above, since they undergo a cross-linking reaction without such treatment.

Furthermore, according to this method, even a non-solvent type resin can effectively used for the back coating, since it can be cured in a short period of time without requiring any solvent.

As the active energy rays to be used for cross-linking of the backing layer of the present invention, there may be employed electron beams generated from a radiation accelerator as the source of radiation, $\gamma$-rays generated from $Co^{60}$ as the source of radiation, $\beta$-rays generated from $Sr^{90}$ as the source of radiation, or X-rays generated from an X-ray generator as the source of radiation.

From the viewpoints of the easy control of the absorption dose, the introduction to the production line, or the shielding of ionized radiation, it is particularly advantageous to use the radiation rays from the radiation accelerator as the source of radiation.

With respect to the characteristics of the radiation rays to be used for the curing of the backing layer, it is preferred, from the aspect of the penetrating power, to irradiate by means of the radiation accelerator having an acceleration voltage of from 100 to 750 KV, or preferably from 150 to 300 KV, at an absorption dose in a range of from 0.5 to 20 Mrad.

For the curing of the backing layer according to the present invention, a low dose type radiation accelerator (an electron-curtain system) manufactured by Energy Science Co., U.S.A. is extremely advantageous from the viewpoints of its easy introduction into the tape coating process line and the shielding of the secondary X-rays within the accelerator.

Needless to say, it is possible to use a Van de Graaff type accelerator which has so far been used widely as the radiation accelerating apparatus.

Further, for the cross-linking by radiation, it is important to irradiate the backing layer with the radiation rays in an inert gas stream such as nitrogen ($N_2$) gas, helium (He) gas, and so forth. It is extremely disadvantageous to conduct the radiation in the air because $O_3$, etc. generated by the radiation for the cross-linking of the binder components serve to prevent the radicals generated in the polymer from acting advantageously for the cross-linking reaction.

It is therefore important to maintain the atmosphere at a portion where the active energy rays are irradiated to be an inert gas atmosphere such as $N_2$, He or $CO_2$, with the oxygen concentration being as low as 1% at the maximum.

The binder component of the backing or magnetic layer may further contain, as a part thereof, a radiation curable monomer such as acrylic acid, methacrylic acid, acrylamide or methacrylamide.

In order to improve the abrasion resistance, the adhesion and the flexibility, the radiation curable resin may be combined with a polyurethane elastomer, a polyurethane prepolymer, an acrylonitrile-butadiene copolymer elastomer, or a polybutadiene elastomer. Further, an epoxy resin, a phenoxy resin, a cellulose or a vinyl chloride-vinyl acetate copolymer may also be used in combination therewith.

As the active energy rays to be used for curing the backing layer, there may be employed electron beams,
$\gamma$-rays, $\beta$-rays or X-rays. It is advantageous to employ a radiation accelerator having an acceleration voltage of from 100 to 750 KV, preferably from 150 to 300 KV, and thereby to conduct the irradiation at an absorption dose in the range of from 0.5 to 20 Mrad. As the atmosphere for the curing treatment, it is important to employ an inert gas such as nitrogen ($N_2$) gas, helium (He) gas or carbon dioxide ($CO_2$) gas to prevent the deterioration of the crosslinking reaction due to the resulting $O_3$.

When the backing layer is made of a radiation curable binder, it will be more uniform and tougher than the backing layer formed from a thermosetting binder.

The presence of the backing layer tends to increase jitter. The "jitter" is a phenomenon for a fine phase modulation around the recording frequency. This phenomenon is believed to be connected with the smoothness of the tape running. Such jitter can be solved by incorporating a very small amount of a lubricant of a fatty acid or fatty acid ester type. Such an acid or ester is preferably the one having from 10 to 22 carbon atoms, such as lauric acid, stearic acid, myristic acid, or a mixture thereof. Adequate effect is obtainable when it is used in an amount of at most 3% by weight of the total weight of the backing layer.

Now, the present invention will be described in further detail with reference to Examples. However, it should be understood that the present invention is by no means restricted by these specific Examples.

Magnetic layer 1:

Various alloy powders were prepared by a wet-reducing method. These powders were composed of acicular particles having an axial ratio (i.e. short axis/long axis) of from 1/5 to 1/10, and having a residual magnetic flux density of from 2000 to 3000 gauss, a coercive force of from 1000 to 2000 Oe and a BET specific surface area of from 45 to 70 $m^2/g$. Each of these magnetic powders was mixed with other components in the following mixing ratio by a usual method.

|  | Parts by weight |
|---|---|
| Fe—Co—Ni alloy powder | 100 |
| Vinyl chloride-vinyl acetate-vinyl alcohol copolymer (VAGH manufactured by U.C.C. Co., U.S.A) | 15 |
| Polyurethane prepolymer (Desmodule 22 manufactured by Bayer AG) | 10 |
| Methyl ethyl ketone/toluene (1/1) | 250 |
| Myristic acid | 2 |
| Sorbitol stearate | 2 |

To the mixture thus obtained, 30 parts by weight of a polyisocyanate (Desmodule L manufactured by Bayer AG) was added to obtain a magnetic coating material. The coating material was coated on a polyester film in a thickness of 3.5 $\mu$m, and subjected to calender treatment.

EXAMPLE 1

A mixture having the following composition was mixed for a backing layer.

|  | Parts by weight |
|---|---|
| Vinyl chloride-vinyl acetate-vinyl alcohol copolymer (VAGH | 30 |
| Polyurethane prepolymer (Desmocol 22) | 20 |

-continued

|  | Parts by weight |
|---|---|
| Carbon black (particle size 40 mμm) (Asahi Hs 500, manufactured by Asahi Carbon Co.) | 70 |
| Methyl ethyl ketone/toluene (50/50) | 200 |

To this mixture, 30 parts by weight of a polyisocyanate (Desmodule L) was added and mixed. The mixture was coated on the above-mentioned polyester film having the magnetic layer, in a thickness of 1.5 μm, dried, subjected to calender treatment and then thermoset. The film thereby obtained was cut into a video tape.

The surface roughness of the backing layer was varied within the range of from 0.05 to 0.8 μm by adjusting the calender treatment to various levels. Likewise, the surface roughness of the magnetic layer was varied within the range of from 0.01 to 0.08 μm.

EXAMPLE 2

Video tapes with magnetic layers having various surface roughness within the range of from 0.01 to 0.08 μm and with backing layers having various surface roughness within the range of from 0.05 to 0.8 μm, were prepared in the same manner and under the same conditions as in Example 1 except that the composition of the backing layer was changed as follows:

|  | Parts by weight |
|---|---|
| Nitrocellulose (Nitrocellulose manufactured by Dicel Ltd.) | 30 |
| Vinyl chloride-vinyl acetate-vinyl alcohol copolymer (VAGH | 20 |
| Carbon black (particle size 30 mμm) (Asahi HS 500, manufactured by Asahi Carbon Co.) | 50 |
| Polyurethane prepolymer (Desmocol 22) | 20 |

EXAMPLE 3

|  | Parts by weight |
|---|---|
| Carbon black (particle size 20 mμm) | 50 |
| Acryl-modified vinyl chloride-vinyl acetate-vinyl alcohol copolymer(a) (prepared by Synthesis a)) | 30 |
| Acryl-modified polyurethane elastomer(e) | 20 |
| Solvent mixture (MIBK/toluene = 1/1) | 300 |

The mixture having the above composition was dispersed in a ball mill for five hours, and the dispersed mixture was coated on the rear surface of the polyester film, on which a magnetic layer had already been formed, in such a manner that the thickness of the backing layer upon drying would be 1.5 μm. Then, this backing layer was irradiated with and cured by electron beams in a nitrogen (N₂) gas by means of an electron curtain type electron beam accelerator at an accelerating voltage of 150 KeV, at an electrode current of 10 mA, and at an absorption dose of 5 Mrad. Then, the coated film was calendered and wound up on a reel, and cut into a video-tape with a width of ½ inch.

EXAMPLE 4

|  | Parts by weight |
|---|---|
| Carbon black (particle size 60 mμm) | 50 |
| Acryl-modified polyester resin(c) | 60 |
| Solvent mixture | 300 |

The above mixture was processed in the same manner as in Example 3 to obtain a sample tape.

EXAMPLE 5

|  | Parts by weight |
|---|---|
| Carbon black (particle size 60 mμm) | 50 |
| Acryl-modified polyester elastomer(e) | 30 |
| Vinyl chloride-vinyl acetate-vinyl alcohol copolymer (VAGH) | 70 |
| Solvent mixture | 300 |

The above mixture was processed in the same manner as in Example 3 to obtain a sample tape.

In order to study the effect of the order of the formation of the magnetic layer and the backing layer, magnetic layers 2 and 3 were prepared.

Magnetic layer 2:

By using the same magnetic alloy powder and base material as used for the magnetic layer 1, a mixture having the following composition was coated on a polyester film in a thickness of 3.5 μm, and subjected to electron beam curing and calender treatment:

|  | Parts by weight |
|---|---|
| Fe—Co—Ni alloy powder | 100 |
| Vinyl chloride-vinyl acetate-vinyl alcohol copolymer (VAGH) | 5 |
| Polyvinyl butyral resin(b) | 10 |
| Acrylic double bond-containing urethane(e) | 10 |
| Methyl ethyl ketone/toluene (50/50) | 250 |

Magnetic layer 3:

A magnetic recording medium was prepared in the same manner as the preparation of the magnetic layer 2 by using a mixture having the following composition:

|  | Parts by weight |
|---|---|
| Fe—Co—Ni alloy powder | 100 |
| Saturated polyester resin | 5 |
| Acrylic double bond-containing vinyl chloride-alcohol copolymer(a) (Degree of polymerization: 300) | 10 |
| Acrylic double bond-containing polyether urethane elastomer(f) | 10 |
| Solvent mixture | 250 |

Video tapes were prepared by changing the order of the formation of the magnetic layers 1, 2 and 3 and the backing layers of Examples 1, 3, 4 and 5. The orders of the formation of the layers were as identified in the following Table 1, including those of the foregoing Examples. In each case, calender treatment was applied at the time of the formation of each layer.

In Table 1, (1) and (2) indicate the order of the formation of the respective layers.

Further, as Comparative Examples, Table 1 includes a case where the magnetic layer 1 is formed but no backing layer is formed (Comparative Example 1), and a case where the same backing layer as in Example 3 except for the average particle size of the carbon black being 80 mμm was employed as the backing layer, and the magnetic layer 2 was employed as the magnetic layer (Comparative Example 2).

Various characteristics of these magnetic recording media are also shown in Table 1. The methods for the measurement of these characteristics will be described hereinafter. Further, in each of the magnetic recording medium listed in the Table, the surface roughness was within the range as specified in the present invention.

The data in the above Table 1 may be summarized as follows:

(1) In the repeated running operation under a high temperature high humidity condition (at 40° C. under a relative humidity of 60%), 1. in Comparative Example 1, the initial friction and the friction after 100 runs are high under the high temperature high humidity condition; a cinching phenomenon occurred since no carbon was used; a number of dropouts were observed; and the abrasion of the backing layer took place since the friction of the backing layer was high;

TABLE 1

| | Magnetic layer | Backing layer | Y-S/N (dB) | Friction coefficient 0 run | Friction coefficient 100 runs | Cin-ching | Adhesion with the magnetic layer | Dropouts 0 run | Dropouts 100 runs | Electric resistance ($\Omega/cm^2$) | Abrasion of the backing layer |
|---|---|---|---|---|---|---|---|---|---|---|---|
| A | (1) Magnetic layer | (2) Example 1 | −0.5 | 0.30 | 0.35 | ○ | ○ | 50 | 100 | $1 \times 10^{10}$ | ○ |
| B | (1) Magnetic layer | (2) Example 2 | −0.5 | 0.30 | 0.33 | ○ | ⊙ | 60 | 120 | $2 \times 10^8$ | ⊙ |
| C | (1) Magnetic layer | (2) Example 3 | −0.2 | 0.29 | 0.32 | ○ | ⊙ | 50 | 80 | $2 \times 10^8$ | ⊙ |
| | Magnetic layer | Example 4 | −0.3 | 0.28 | 0.32 | ○ | ⊙ | 50 | 85 | $1 \times 10^8$ | ⊙ |
| | Magnetic layer | Example 5 | −0.2 | 0.29 | 0.32 | ○ | ⊙ | 60 | 80 | $6 \times 10^8$ | ⊙ |
| D | (2) Magnetic layer | (1) Example 3 | −0.2 | 0.29 | 0.33 | ○ | ⊙ | 50 | 80 | $2 \times 10^8$ | ⊙ |
| E | (1) Magnetic layer | (2) Example 3 | 0 | 0.29 | 0.33 | ○ | ⊙ | 50 | 60 | $3 \times 10^8$ | ⊙ |
| | (2) Magnetic layer | (1) Example 4 | 0 | 0.29 | 0.33 | ○ | ⊙ | 55 | 65 | $2 \times 10^8$ | ⊙ |
| | (1) Magnetic layer | (2) Example 5 | 0 | 0.29 | 0.33 | ○ | ⊙ | 55 | 60 | $1 \times 10^8$ | ⊙ |
| Comparative Example 1 | (1) Magnetic layer | (2) None | 0 | 0.50 | — | X | X | 500 | — | $1 \times 10^{15}$ | X |
| Comparative Example 2 | (1) Magnetic layer | (2) Example 3 (Carbon: 300 μm) | −1.1 | 0.30 | 0.37 | X | X | 150 | 500 | $1 \times 10^{11}$ | X |

Note:
⊙ Excellent;
○ Good;
X No good

STUDY OF THE RESULTS

The surface roughness of the video tapes obtained in Example 1 was studied. FIG. 1 shows the S/N ratios (relative values) in the case where the video tapes were driven at a speed of 3.8 m/sec, and the recording and reproduction were conducted with a major frequency of 4.5 MHz. The numerical values alloted to the curves indicate the surface roughness. As is evident from the Figure, the S/N ratio can be kept at a high level when the surface roughness of the magnetic layer is at most 0.08 μm, and the surface roughness of the backing layer is at most 0.6 μm. The same was true also with respect to Examples 2, 3, 4 and 5.

Then, from the study of the running friction, it was found that the friction was great when the surface roughness of the backing layer was less than 0.05 μm.

In Example 1, the relation between the BET specific surface area of the alloy powder and the S/N ratio was investigated with respect to the video tapes wherein the surface roughness of the magnetic layer was at most 0.08 μm and the surface roughness of the backing layer was within a range of from 0.05 to 0.6 μm, whereby the results as shown in FIG. 2 were obtained. However, 55 dB was employed as the reference. From FIG. 2, it is apparent that excellent characteristics are obtainable when the BET value is at least 48 $m^2/g$. The same was true also in the case of other Examples.

2. as between A and B, B was better since nitrocellulose was incorporated therein;

3. with respect to C and D, the backing layer was made of an electron beam curable type resin, and accordingly the transfer of the layers during the thermosetting operation was minimized, whereby the dropouts decreased;

4. E was further improved since both layers were made of an electron beam curable resin;

5. in Comparative Example 2, the carbon black had a particle size of 80 mμm, and accordingly, the rear surface had a surface roughness $R_{20}$ of 0.70 μm, whereby the electromagnetic characteristics deteriorated to a substantial extent; and since the particle size was great, the distribution in the backing layer was non-uniform and no adequate reduction of the electric resistance was attained, whereby the abrasion of the backing layer took place, the adhesion occurred, and a number of dropouts were observed.

(2) When the radiation curable binder was used, the transfer of the layers was minimized, whereby the characteristics were improved.

The various characteristics were measured or evaluated as follows:

1. Frictional coefficient

A magnetic tape was put around a polished aluminum cylinder having a diameter of 4 mm at an angle of 180° so that the backing layer is located inside, and permitted to run at a speed of 2 cm/sec, whereby the tensions at the dispensing side and at the winding-up side were measured, and the frictional coefficient was obtained by calculation from the measured values.

2. Cinching phenomenon

By means of a commercially available VHS system VTR, a tape was permitted to run 100 times (100 runs) at 40° C. under a relative humidity of 60%, and then, the winding of the tape was visually examined. Good winding where no space was observed in the tape winding, was evaluated as "Good", and inferior winding where a space was observed in the tape winding, was evaluated as "No good".

3. Abrasion of the backing layer

By means of a commercially available VHS system VTR, a tape was permitted to run 100 times at 40° C. under a relative humidity of 60%, whereupon the stain in the cassette case was examined. The case where a stain was observed, was evaluated as "No good", and the case where no stain was observed, was evaluated as "Good".

4. Adhesion of the magnetic layer with the backing layer

A tape was wound up on a VHS reel, and left to stand at 60° C. for 5 days, whereupon the adhesion was visually evaluated. The case where no adhesion was observed, was evaluated as "Good", and the case where adhesion was observed, was evaluated as "No good".

5 Surface roughness

The surface roughness was obtained by 20 point average method from the chart obtained by means of Tallistep (manufactured by Taylor-Hobson Co.).

6. Electromagnetic characteristics (1) The S/N ratio (relative value) was shown as recorded and reproduced at a major frequency of 5 MHz. VTR of VHS was modified so that it was capable of measuring up to 5 MHz.

(2) The dropouts were measured at 15 μS and represented by the number/min.

7. Electron microscopic method (1) The average particle size was measured by a transmission electron microscope by selecting a sample from each tape.

We claim:

1. A magnetic recording medium comprising a plastic base film, a magnetic layer formed on one side of the base film and composed of a ferromagnetic alloy powder dispersed in a resin binder, and a backing layer formed on the other side of the base film, characterized in that said ferromagnetic alloy powder has a surface area of at least 48 $m^2/g$ as measured by BET method, said magnetic layer has a coercive force of at least 1,000 Oe and a surface roughness of at most 0.08 μm, and said backing layer is composed essentially of a thermoset or radiation-cured resin and carbon black dispersed in the resin, and has a surface roughness of from 0.05 to 0.6 μm, said carbon black having an average particle size of from 10 to 60 mμm as measured by an electron microscope.

2. The magnetic recording medium according to claim 1, wherein the thermoset resin is made of a thermosetting binder comprising a vinyl chloride-vinyl acetate-vinyl alcohol copolymer, a polyurethane prepolymer and a polyisocyanate.

3. The magnetic recording medium according to claim 2, wherein the thermosetting binder further contains nitrocellulose.

4. The magnetic recording medium according to claim 1, wherein the radiation-cured resin is made of a radiation curable binder composed essentially of a radiation sensitive resin having radiation curable acrylic, maleic or allyl-type double bonds.

* * * * *